US012662088B2

(12) United States Patent
Schaeuble

(10) Patent No.: US 12,662,088 B2
(45) Date of Patent: Jun. 23, 2026

(54) METHOD FOR CLEANING, CLEANING DEVICE, AND VEHICLE

(71) Applicant: Robert Bosch GmbH, Stuttgart (DE)

(72) Inventor: Michael Schaeuble, Vaihingen an der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 18/619,361

(22) Filed: Mar. 28, 2024

(65) Prior Publication Data

US 2024/0326758 A1      Oct. 3, 2024

(30) Foreign Application Priority Data

Mar. 31, 2023      (DE) .......................... 102023203009.8

(51) Int. Cl.
B60S 1/66          (2006.01)
(52) U.S. Cl.
CPC ...................................... B60S 1/66 (2013.01)
(58) Field of Classification Search
CPC ...... B60S 1/54; B60S 1/56; B60S 1/66; B60S 1/566; B60S 1/08; B60S 1/0818
See application file for complete search history.

(56) References Cited

U.S. PATENT DOCUMENTS 12,265,009 B2 * 4/2025 Hoeng ............... G01N 15/0806
12,317,111 B2 * 5/2025 Cao ....................... H04L 5/0073

12,415,410 B1 * 9/2025 Hansen .................... B60J 11/04
12,415,510 B1 * 9/2025 Funke ................. B60W 30/095
12,415,525 B1 * 9/2025 Automata ............. B60W 50/14
12,415,549 B1 * 9/2025 Parikh ................... B60W 40/02
12,415,581 B2 * 9/2025 Iida ....................... B62D 65/026
12,416,730 B1 * 9/2025 Papi .................... B60W 60/001
12,416,740 B2 * 9/2025 Donderici ............... G01V 3/08
12,417,420 B1 * 9/2025 Baldi .................. G06Q 10/087
12,417,657 B1 * 9/2025 Lin ....................... G07C 5/0808
12,417,706 B1 * 9/2025 Cartwright ............ G08G 1/165
12,418,897 B1 * 9/2025 Banuli Nanje Gowda .................
G06F 16/9024

OTHER PUBLICATIONS

Shanbhag et al., Vehicle Detection and Traffic Control Using Sensor Technology, 2023, IEEE, p. 1-6 (Year: 2023).*
(Continued)

*Primary Examiner* — Mcdieunel Marc
(74) *Attorney, Agent, or Firm* — Michael Best & Friedrich LLP

(57)          ABSTRACT

A method for cleaning at least one driving assistance sensor (12), in particular a LiDAR sensor, a camera sensor, a radar sensor, or the like, in an autonomously or semi-autonomously operated vehicle (10) having at least one environmental sensor unit (14), in particular spaced apart from the driving assistance sensor (12). It is proposed that in at least one method step (32), a cleaning program is selected and/or set from a plurality of, in particular predefined, cleaning programs for cleaning the driving assistance sensor (12), in particular at least one sensor field surface (16) of the driving assistance sensor (12), at least as a function of at least one measured parameter of the environmental sensor unit (14).

14 Claims, 3 Drawing Sheets

(56) References Cited

OTHER PUBLICATIONS

Hsieh et al., Optimal Multi-Sensor Selection for Driver Assistance
Systems under Dynamical Driving Environment, 2007, IEEE, p.
696-701 (Year: 2007).*
Kuznietsov, A scaled autonomous vehicle platform to develop and
investigate driver assistance and control algorithm, 2011, IEEE, p.
305-309 (Year: 2011).*
Walz et al., A Benchmark for Spray from Nearby Cutting Vehicles,
2021, IEEE, p. 188-195 (Year: 2021).*

* cited by examiner

METHOD FOR CLEANING, CLEANING DEVICE, AND VEHICLE

BACKGROUND

A method for cleaning at least one driving assistance sensor in an autonomously or semi-autonomously operated vehicle with at least one environmental sensor unit has already been proposed.

SUMMARY

The invention proceeds from a method for cleaning at least one driving assistance sensor, in particular a LiDAR sensor, a camera sensor, a radar sensor, or the like, in an autonomously or semi-autonomously operated vehicle having at least one environmental sensor unit, in particular spaced apart from the driving assistance sensor.

It is proposed that in at least one method step, a cleaning program is selected and/or set from a plurality of, in particular predefined, preferably different, cleaning programs for cleaning the driving assistance sensor, in particular at least one sensor field surface of the driving assistance sensor, at least as a function of at least one measured parameter of the environmental sensor unit.

Due to the configuration of the method for cleaning according to the invention, a design can be advantageously provided at low cost, as in particular a cleaning of a plurality of driving assistance sensors can be performed depending on at least one measured parameter of fewer or only a single environmental sensor unit. Advantageously, a low assembly complexity can be provided, as in particular only a few or only a single environmental sensor unit must be installed in the vehicle in order to select the cleaning program for each of the driving assistance sensors. Advantageously, a high cleaning efficiency can be achieved, as in particular the cleaning program can be optimally selected at least as a function of the one measured parameter of the environmental sensor unit. Advantageously, wear and/or wash water consumption can be reduced, as in particular the at least one driving assistance sensor is only cleaned when needed and/or wash water is only applied/consumed when needed when cleaning the at least one driving assistance sensor.

Preferably, the at least one, preferably optical, driving assistance sensor and/or the at least one, preferably optical, environmental sensor unit is arranged in or on the vehicle. In particular, the at least one driving assistance sensor is spaced apart from the at least one environmental sensor. In particular, the at least one, preferably all, driving assistance sensors and the at least one environmental sensor unit are arranged in different areas of the vehicle, such as a roof region, a front region, a rear region, a side region of an underbody region, or the like. Preferably, the vehicle comprises a plurality of driving assistance sensors. In particular, different regions of the vehicle each comprise at least one driving assistance sensor. Preferably, the vehicle is configured as a car and/or truck and/or ship and/or aircraft and/or drone.

Preferably, an autonomous and/or semi-autonomous driving function of the vehicle is enabled by the at least one driving assistance sensor. In this context, the term "driver assistance sensor" is in particular understood as a sensor that monitors an environment of the vehicle and transmits it to a control unit of the vehicle. The vehicle control unit can calculate and/or issue control commands, warnings, advisories, or suggestions for vehicle operation based on the sensor data. Preferably, a measurement principle of the driving assistance sensor is based on a reception and/or emission of electromagnetic beams. In particular, the electromagnetic beams pass through the sensor field, especially the vehicle window and/or a protective cover of the sensor, before being received. In particular, after being emitted, the electromagnetic beams pass through the sensor field, especially the vehicle window and/or a protective cover of the sensor. It is conceivable that the sensor is provided for high-frequency distance and speed measurement for object detection and/or collision avoidance. The sensor can, e.g., be used to control and regulate autonomous, and/or computer-assisted operation of vehicles or to support manual driving operation, e.g., by a lane departure warning system, a parking assistant, a distance warning system, a hazard detection system, and many more. It is also conceivable that the sensor, in particular one of the sensors, is designed as a radar sensor.

In particular, the driving assistance sensor comprises at least one cleaning unit. Preferably, the vehicle comprises the cleaning unit of the driving assistance sensor. It is conceivable that the vehicle comprises multiple cleaning units, each of which is associated with different driving assistance sensors. In particular, the cleaning unit is configured to clean the respective associated driving assistance sensor. The cleaning unit can have different cleaning programs, which can have different cleaning intensities, for example. Preferably, to clean the driving assistance sensor, a sensor wiper unit of the driving assistance sensor is guided over the sensor field surface of the sensor, in particular in a contacting manner. In particular, in the method for cleaning the driving assistance sensor, a speed of movement and/or a cleaning interval of the sensor wiper unit is defined. In particular, in the method for cleaning the driving assistance sensor, an amount of wash water and/or a wash water interval and/or a wash water pressure and/or a further cleaning parameter are defined for a wash water wetting of the sensor field surface of the sensor to be cleaned. In particular, a "cleaning program" should be understood to mean predefined cleaning parameters, for example a cleaning interval and/or a speed of movement of a sensor wiper unit and/or a pressure, an amount, and/or an interval of a wash water supply. In particular, the selection of the cleaning program in the method step defines the respective cleaning intensity and/or the respective cleaning method, which is carried out by the cleaning unit upon an instantaneous activation of the respective cleaning unit. In particular, "selected" should be understood to mean an assignment of a program and/or an area. In particular, "set" should be understood to mean an activation of a selected and/or assigned and/or defined program. The term "configured" is in particular understood to mean specifically programmed, designed, and/or equipped. The phrase "an object being provided for a specific function" is particular configured and/or provided to mean that the object fulfills and/or performs this specific function in at least one application and/or operating state. In particular, the environmental sensor unit is provided for a measurement of at least one measured parameter configured as environmental parameters, in particular an environment of the vehicle. It is conceivable that the environmental sensor unit comprises a single environmental sensor or a plurality of environmental sensors, which preferably each detect different environmental parameters. Preferably, the environmental sensors of the environmental sensor unit are collocated.

Furthermore it is proposed that in at least one further method step, a cleaning program is selected and/or set from the plurality of, in particular predefined, cleaning programs for cleaning a further driving assistance sensor of the autonomously or semi-autonomously operated vehicle, in particular at least one sensor field surface of the further driving assistance sensor, at least as a function of at least one measured parameter of the environmental sensor unit, preferably the measured parameter of the environmental sensor unit used in the method step. Advantageously, a low-cost design can be provided, as in particular cleaning of the driving assistance sensor, the further driving assistance sensor, and/or additional further driving assistance sensors of the vehicle can be performed depending on at least one measured parameter of a single environmental sensor unit. Advantageously, a low assembly complexity can be provided, as in particular only a few environmental sensor units need to be installed in the vehicle in order to select the cleaning program for the driving assistance sensor, the further driving assistance sensor and/or further additional driving assistance sensors. Advantageously, a high cleaning efficiency can be achieved, as in particular the cleaning program can be optimally selected at least as a function of the one measured parameter of the environmental sensor unit. It is conceivable that a plurality of further additional driving assistance sensors is arranged on or in the vehicle in addition to the driving assistance sensor and the further driving assistance sensor. Preferably, the cleaning program for the driving assistance sensor and/or the further driving assistance sensor and/or further additional driving assistance sensors is selected is individually from the plurality of, in particular predefined, cleaning programs. It is conceivable that the same cleaning programs or a different individual cleaning program selection is available for the driving assistance sensor and/or the further driving assistance sensor and/or for further additional driving assistance sensors. Preferably, a cleaning program is selected for the driving assistance sensor, the further driving assistance sensor and/ or for one or more further additional driving assistance sensors independent of the remaining driving assistance sensors. It is conceivable that the same cleaning program is selected for the driving assistance sensor, the further driving assistance sensor and/or the one or more further additional driving assistance sensors in at least one operating state. Preferably, the cleaning programs for the driving assistance sensors are selected based on the same measured parameter of the environmental sensor unit. Alternatively, the cleaning programs for different driving assistance sensors or groups of multiple driving assistance sensors could be selected from different measured parameters of the one environmental sensor unit.

Furthermore, it is proposed that the driving assistance sensor and the further driving assistance sensor have differently oriented fields of view. Advantageously, a complexity can be reduced, as in particular with one and/or a few environmental sensor units, all driving assistance sensors with differently oriented fields of view can be cleaned efficiently. Preferably, the fields of view of the driving assistance sensor and the further driving assistance sensor do not overlap. For example, one of the driving assistance sensors could be oriented in the direction of travel and the other opposite the direction of travel. For example, one of the driving assistance sensors could be oriented in the direction of travel and the other at an angle to the direction of travel. For example, one of the driving assistance sensors could be oriented at a first angle to the direction of travel and the other at a second angle to the direction of travel different from the first angle. However, it is also conceivable that the fields of view of two driving assistance sensors at least partially overlap. In particular, a "field of view" is to be understood to mean an image angle of an optical device within which events or changes are detected and/or recorded.

Furthermore, the environmental sensor unit is formed by a sensor unit for controlling and/or activating a window wiper, in particular the front windshield wiper, of the vehicle. Advantageously, a low assembly complexity can be provided, as in particular the environmental sensor and the sensor unit are configured as a component for controlling and/or activating the windshield wiper. Advantageously, an additional benefit for the data of the sensor unit for the control and/or activation of the windshield wiper can be enabled. For example, the sensor unit forming the environmental sensor unit is arranged in a rear mirror base region, in particular outside a field of vision of a driver, in a vehicle compartment, preferably contacting the windshield. In particular, the sensor unit is arranged at least substantially within a surface of the windshield that has been swept by the front windshield wiper. In particular, the environmental sensor unit is formed by a rain/light/climate sensor, as is known for example from windshield wiper control units.

Furthermore, it is proposed that at least one of the measured parameters is configured as a degree of wetting. Advantageously, a high operational reliability can be provided, as the degree of wetting in particular represents a precise and reliable characteristic value for detecting rain and/or soiling. Advantageously, the selection of the cleaning program can be made dependent on an amount of liquid already present on the sensor. For example, an amount of sprayed cleaning liquid could be reduced if it is already raining anyway. Preferably, the degree of wetting is continuously and/or regularly monitored by the environmental sensor unit. Preferably, the degree of wetting is determined on a measurement surface. It is conceivable that the measurement surface is configured as a part of the windshield to determine the degree of wetting. In particular, a "degree of wetting" is be understood to mean a relative, preferably percentage, proportion, which is considered to be an area of the measurement surface wetted/covered by a liquid, for example rain water, wiping water or the like, and/or a solid material, for example dirt, dust, salt, flower pollen, mud or the like, in relation to the total measurement surface of the environmental sensor. In particular, the degree of wetting is configured to assume a value from 0 to 1. For example, the degree of wetting can be determined by a proportion of a reflected light of a light signal emitted by the environmental sensor unit.

In addition, it is proposed that at least one of the measured parameters is configured as a light intensity, in particular a reflected sensor signal of the environmental sensor unit. Advantageously, the selection of the cleaning program can be made dependent on a type of soiling. For example, a strong reduction in the measured light intensity could indicate solid body soiling of the driving assistance sensor, e.g. by salt, dust, etc., so that, for example, an amount or type of the cleaning liquid used could be set accordingly. In particular, the sensor signal is configured as one and/or several, in particular directed, electromagnetic waves, such as a laser beam or comparable light beam. Preferably, the sensor signal is at least substantially reflected by the wetted and/or soiled window, wherein the sensor signal is transmitted by an at least substantially transparent measurement surface of the environmental sensor unit, in particular an unwetted and/or unsoiled measurement surface. Preferably, the environmental sensor unit comprises at least one detection unit configured to detect the reflected sensor signal. In particular, the degree of wetting is configured proportional to the light intensity of the reflected sensor signal.

Furthermore, it is proposed that at least one of the measured parameters is configured as a climate parameter, for example a temperature and/or a relative humidity. Advantageously, a high operational reliability can be provided, as a high cleaning performance and a high level of reliability can be provided in particular by taking the climate parameter into account when selecting the cleaning program. Preferably, the climate parameter is configured as a temperature and/or a, in particular relative, humidity and/or an air pressure and/or a $CO_2$ content or the like. Alternatively, the measured parameters could be provided at least in part from external sensor units and/or read from the control unit.

In addition, it is proposed that in at least one further method step, the cleaning program is selected and/or set for cleaning the driving assistance sensor/driving assistance sensors additionally at least as a function of an orientation of a field of view of the respective driving assistance sensor relative to a forward direction of the vehicle and/or as a function of a position of the respective driving assistance sensor in the vehicle. Advantageously, a particularly high cleaning efficiency can be provided, as in particular a cleaning program is selected depending on the orientation and position of the driving assistance sensor. In particular, a "forward direction" is to be understood to mean a direction of movement, which predominantly prevails when the vehicle is normally driven. In particular, the forward direction is arranged at least substantially parallel to a longitudinal extension of the vehicle. Preferably, the forward direction is arranged at least substantially parallel to a direction directed towards a position opposite the side of the windshield facing the vehicle occupants. In particular, the forward direction is arranged at least substantially and/or to a large extent parallel to a viewing direction, in particular the main viewing direction, of the environmental sensor unit. In particular, a "main viewing direction" is understood to an average direction, which is determined from a viewing angle, in particular by means of averaging.

In addition, is proposed that in at least one further method step, the cleaning program is selected and/or set for cleaning the driving assistance sensor/driving assistance sensors additionally at least as a function of a speed of the vehicle and/or a further operating parameter of the vehicle that can be read from a control unit of the vehicle, such as traffic volume in an environment of the vehicle or a cleaning agent level of a cleaning system of the vehicle. Advantageously, a high cleaning performance and/or cleaning efficiency can be provided, as the cleaning program can be selected more precisely, in particular by taking the operating parameters of the vehicle into account. Preferably, the speed of the vehicle and/or the further operating parameters of the vehicle are read from the control unit of the vehicle. Alternatively, it is conceivable that the environmental sensor unit and/or further sensor units provide the speed and/or further operating parameters directly, in particular independently of the control unit. In particular, the operating parameter of the vehicle is configured as an average speed, a trip duration, a distance to preceding vehicles, or the like. Alternatively or additionally, the at least one operating parameter could also be provided from a navigation device of the vehicle and/or from externally provided data, for example a traffic message and/or smartphone data and/or cloud-based information data or the like. In particular, a "control unit" is intended to mean an electronic unit, which is preferably at least partially integrated in a control and/or regulating unit of a vehicle, and which is preferably configured to control and/or regulate at least one operation of the vehicle. Preferably, the control unit comprises a computing unit and, in particular, in addition to the computing unit, a memory unit with a control and/or regulating program stored therein, which is intended to be executed by the computing unit.

Furthermore, in at least one method step, it is provided that an overall factor is formed from at least two, preferably at least three or more than three parameters, in particular measured parameters and/or further parameters that can be used to select the cleaning program, on the basis of which the cleaning program for cleaning of at least the driving assistance sensor is selected and/or set. Advantageously, a high operational safety and/or cleaning efficiency can be provided, as in particular many parameters with different information are incorporated into the assessment. Preferably, an overall factor is determined by summing the individual parameters. Alternatively, the overall factor could also be determined by multiplication or a comparable computational operation. It is conceivable that the cleaning program is estimated by a rating system, in particular a weighting and/or grouping of parameters.

Furthermore, it is proposed that in at least one method step a cleaning requirement for the driving assistance sensor is determined, for example, based on an expiration of a time interval and/or based on a detected level of soiling of the driving assistance sensor, and that the cleaning program selected and/or set in the method step is started if the cleaning requirement is positively determined. Advantageously, a high cleaning efficiency can be provided, as in particular a selection of the cleaning program and cleaning of the driving assistance sensor is only performed when a cleaning requirement is determined. Preferably, the cleaning requirement of the driving assistance sensor is determined based on a level of contamination and/or a degree of wetting of the sensor field surface of the driving assistance sensor determined by a cleaning requirement control unit of the driving assistance sensor. Preferably, the time interval is configured to be adjustable.

In addition, a cleaning device for cleaning at least the driving assistance sensor in the autonomously or semi-autonomously operated vehicle with at least the environmental sensor unit is proposed, wherein the cleaning device comprises a control and/or regulating unit, which is configured at least for selecting and/or setting a cleaning program from a plurality of, in particular predefined, cleaning programs for cleaning the driving assistance sensor, in particular at least one sensor field surface of the driving assistance sensor, at least as a function of at least one measured parameter of the environmental sensor unit. Advantageously, an operating function can be provided, as in particular the control and/or regulating unit can process measured parameters and/or parameters and select the optimal cleaning program. The term "control and/or regulating unit" should in particular be understood to mean a unit comprising at least one control electronics. The term "control electronics" should in particular be understood to mean a unit comprising a processor unit and comprising a memory unit as well as an operating program stored in the memory unit.

Furthermore, a semi-autonomous or fully-autonomous vehicle having at least one driving assistance sensor, and with at least one environmental sensor unit, wherein the vehicle is configured to perform the method for cleaning, and/or wherein the vehicle comprises the cleaning device. Advantageously, a high level of operational safety can be provided, as in particular a high level of cleaning efficiency and/or cleaning performance can be provided. Advantageously, wear and/or wash water consumption can be reduced, as in particular cleaning and/or washing water is consumed only when needed. Advantageously, a high level of reliability of a vehicle operation can be provided, as in particular a high level of cleaning performance can be provided by the cleaning apparatus.

The method for cleaning according to the invention, the cleaning apparatus according to the invention and the vehicle according to the invention, are not intended to be limited to the application and embodiment described above. In particular, the method for cleaning according to the invention, the cleaning apparatus according to the invention and the vehicle according to the invention can comprise a number of individual elements, components, units, and method steps that deviates from a number specified herein for fulfilling a mode of operation described herein. Moreover, regarding the ranges of values indicated in this disclosure, values lying within the limits specified hereinabove are also intended to be considered as disclosed and usable as desired.

BRIEF DESCRIPTION OF THE DRAWINGS

Further advantages follow from the description of the drawings hereinafter. The drawings illustrate an embodiment example of the invention. The drawings, the description, and the claims contain numerous features in combination. A person skilled in the art will appropriately also consider the features individually and combine them into additional advantageous combinations.

Shown are.

DETAILED DESCRIPTION

Figure 1:
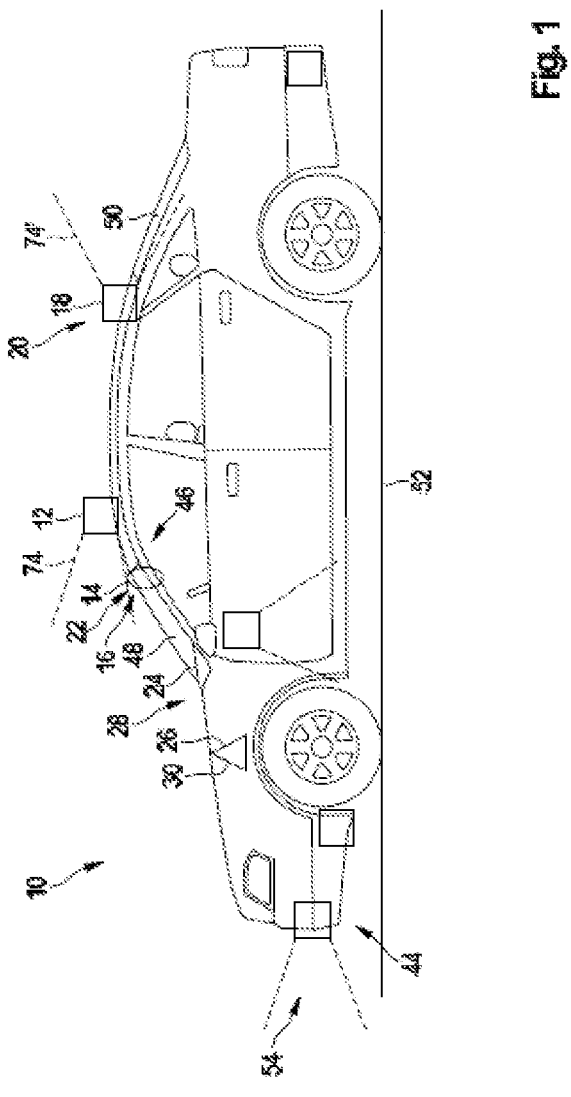
FIG. 1 a schematic illustration of a vehicle having multiple driving assistance sensors and an environmental sensor unit, FIG. 2 a schematic representation of one of the driving assistance sensors having a sensor field surface and a cleaning device, FIG. 3 a schematic flowchart of a method for determining a cleaning requirement of the driving assistance sensors, and FIG. 4 a schematic flowchart of a method for a selection of a cleaning program for cleaning the driving assistance sensor.

FIG. 1 shows a schematic representation of a vehicle 10. The vehicle 10 is designed as an autonomous or semi-autonomous vehicle 10. The vehicle 10 is designed as a passenger car. The vehicle 10 could also be designed as a utility vehicle. The vehicle 10 comprises a control unit 26. The control unit 26 is configured to control the vehicle 10. The vehicle 10 includes a windshield 48. The windshield 48 partially limits a passenger compartment 46 of the vehicle 10. The vehicle 10 includes a windshield wiper 24. The windshield wiper 24 is configured as a front windshield wiper. The windshield wiper 24 contacts the windshield 48 on a side of the windshield 48 opposite the passenger compartment 46. The vehicle 10 comprises a cleaning system 28. For example, the cleaning system 28 includes a wash water tank and/or wash water level sensors and/or wash water lines, and/or the like. The vehicle 10 comprises an environmental sensor unit 14. The environmental sensor unit 14 is arranged in a rear view mirror base region in a passenger compartment 46 of the vehicle 10. The environmental sensor unit 14 is configured as a sensor unit 22 to control the front windshield wiper 24 of the vehicle 10. The environmental sensor unit 14 could also be arranged in a front region 54 of the vehicle 10. The vehicle 10 comprises a driving assistance sensor 12. The driving assistance sensor 12 has a sensor field surface 16. The driving assistance sensor 12 is arranged on a roof of the vehicle 10. The driving assistance sensor 12 is arranged in the vicinity of the windshield 48 of the vehicle 10. The driving assistance sensor 12 is designed as a LiDAR sensor. The vehicle 10 comprises a further driving assistance sensor 18. The further driving assistance sensor 18 comprises a further sensor field surface 20. The further driving assistance sensor 18 is arranged on a roof of the vehicle 10. The further driving assistance sensor 18 is arranged in the vicinity of a rear window 50 of the vehicle 10. The driving assistance sensor 18 is designed as a LiDAR sensor. The vehicle 10 comprises an additional further driving assistance sensor 44. The additional further driving assistance sensor 44 is arranged in the front region 54 of the vehicle. The additional further driving assistance sensor 44 is arranged in the vicinity of a road surface 52 on which the vehicle 10 is standing. The additional further driving assistance sensor 44 is configured as a LiDAR sensor. The vehicle 10 comprises a cleaning apparatus for cleaning the driving assistance sensor 12, 18, 44. The vehicle 10 comprises a control and/or regulating unit 30. The control and/or regulating unit 30 is configured to select and set a cleaning program from a plurality of predefined cleaning programs for cleaning the driving assistance sensor 12, 18, 44 as a function of a measured parameter of the environmental sensor unit 14. The control and/or regulating unit 30 could also be configured as the control unit 26 of the vehicle 10. The driving assistance sensor 12, 18, 44 could also be configured as a camera sensor or radar sensor or a comparable optical sensor. The driving assistance sensor 12, 18, 44 is arranged spaced apart from the environmental sensor unit 14. The driving assistance sensor 12 and the further driving assistance sensor 18 have differently oriented fields of view 74. Alternatively, at least one of the driving assistance sensors 12, 18, 44 could be arranged adjacent to the environmental sensor unit 14 or integrated into the environmental sensor unit 14.

Figure 2:
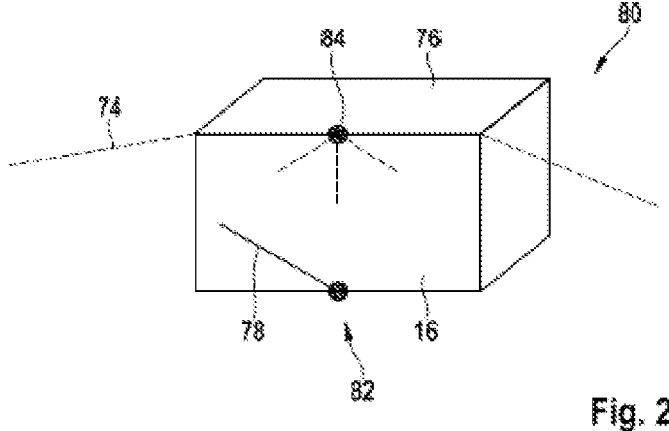

FIG. 2 exemplarily shows a schematic representation of the driving assistance sensor 12. The driving assistance sensor 12 includes a sensor housing 76. The driving assistance sensor 12 comprises a sensor element 80. The sensor element 80 is arranged in the sensor housing 76. The sensor element 80 is designed as a LiDAR sensor. The driving assistance sensor 12 has a sensor field surface 16. The sensor field surface 16 is designed to be transparent. The sensor field surface 16 defines an orientation of the field of view 74 of the driving assistance sensor 12. The driving assistance sensor 12 includes a cleaning apparatus 82. The cleaning apparatus 82 is part of the cleaning system 28 of the vehicle 10. The cleaning apparatus 82 includes a sensor wiper 78. The sensor wiper 78 contacts the sensor field surface 16. The sensor wiper 78 is moved via the sensor field surface 16. The driving assistance sensor 12 includes a wash water nozzle 84. The wash water nozzle 84 is configured to apply wash water of the cleaning system 28 to the sensor field surface 16.

Figure 3:
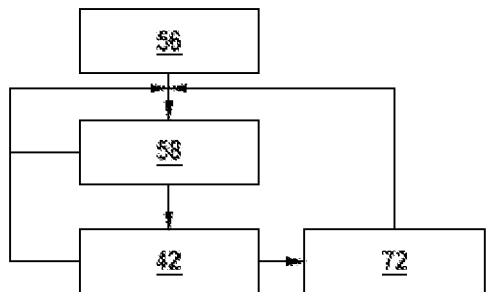

FIG. 3 shows a schematic flow diagram of a method for determining a cleaning requirement of the driving assistance sensors 12, 18, 44. In a method step 56, vehicle operation is started. For example, vehicle operation is started by turning on an engine of the vehicle 10. In another method step 58, it is determined whether the vehicle 10 is operated in an autonomous driving mode. When the vehicle 10 is operated in an autonomous or semi-autonomous driving mode, the further method step 58 is selected. When the vehicle 10 is operated in the autonomous or semi-autonomous driving mode, a further method step 42 is selected. In the further method step 42, a cleaning requirement of the driving assistance sensors 12, 14, 44 is checked. The cleaning requirement is determined by the end of a time interval. For example, cleaning could be initiated after 5 minutes or a comparable time interval. Alternatively or additionally, a positive cleaning requirement is determined by the driving assistance sensor 12, 18, 44 by detecting contamination from the driving assistance sensor 12, 18, 44 and/or requesting a cleaning requirement. If a negative cleaning requirement is found in the further method step 42, the further method step 58 is selected. If a positive cleaning requirement is found in the further method step 42, a further method step 72 is selected. In the further method step 72 the cleaning program is activated. Activating the cleaning program starts the cleaning program.

Figure 4:
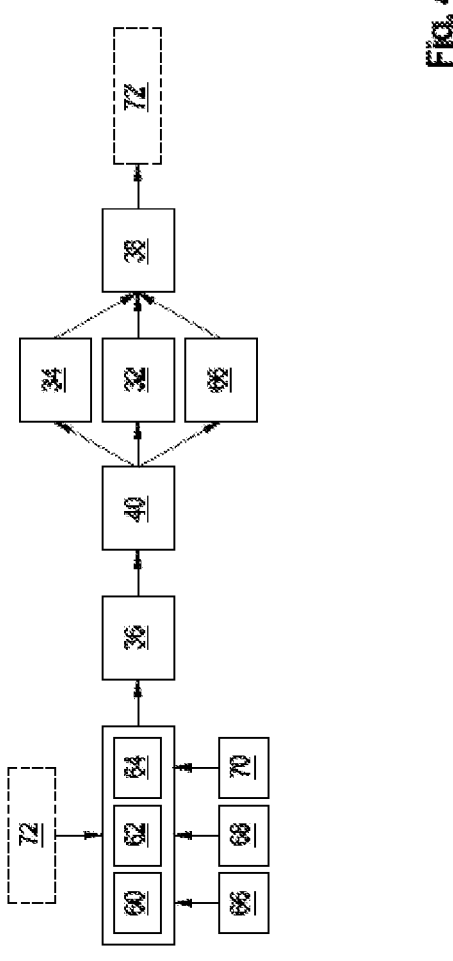

FIG. 4 shows a schematic flow diagram of the method for a selection of a cleaning program for a cleaning the driving assistance sensor 12, 18, 44. In a method step 66, the measured parameter of the environmental sensor unit 14 is determined. The measured parameter is configured as a degree of wetting. The measured parameter is configured as a light intensity of a reflected sensor signal of the environmental sensor unit 14. The degree of wetting is determined based on the light intensity of the reflected sensor signal. The degree of wetting is output as a value between 0% and 100%. A wetting factor is assigned to each degree of wetting in a further method step 60. In the table below, an exemplary wetting factor is associated with each degree of wetting.

| Degree of wetting/reflected light of the rain/light/climate sensor [%] | Wetting factor |
| --- | --- |
| 0 | 1 |
| 50 | 0.5 |
| . . . | . . . |
| 100 | 0.2 |

Alternatively, further divisions of the measured parameter could be established. Alternatively, the measured parameter could also be configured as a climate parameter. For example, the climate parameter could be configured as a temperature and/or a relative humidity and/or an ambient pressure and/or the like. Alternatively, the cleaning program could also be selected as a function of two or more than two measured parameters of the environmental sensor unit 14.

In another method step 68, a speed of the vehicle 10 is read from the control unit 26 of the vehicle 10. Alternatively, the speed of the vehicle 10 could also be determined from GPS data of a navigation system or smartphone or the like. In another method step 62, a speed factor is associated with each vehicle speed. In the table below, a speed factor is associated to each speed of the vehicle 10 as an example.

| Vehicle speed [km/h] | Speed factor |
| --- | --- |
| 0 | 1 |
| 50 | 0.5 |
| 100 | 0.25 |
| . . . | . . . |

In a further method step 70, operating parameters such as traffic volume in an environment of the vehicle 10 and/or a cleaning agent level of the cleaning system 28 of the vehicle 10 or an average speed of the vehicle 10, or the like could be read from the control unit 26 or a smart phone or a cloud, or the like. In a further method step 64, each of the operating parameters could be associated with an operating factor.

In a further method step 36, an orientation of a field of view 74 of the respective driving assistance sensor 12, 18, 44 relative to a forward direction of the vehicle 10 is considered. For example, a direction factor could be associated with the orientation of the driving assistance sensor 12, 18, 44. In an orientation of the driving assistance sensor 12, 18, 44 in the forward direction, a value of 1 could be associated with the direction factor. In an orientation of the driving assistance sensor 12, 18, 44 in a direction opposite to the forward direction, the direction factor could be associated with a value of 0.2. Any orientation between the forward direction and the opposite forward direction could be associated with a further value between 1 and 0.2. Furthermore, a position of the driving assistance sensors 12, 18, 44 on the vehicle is considered. A position factor is associated with each driving assistance sensor. In this embodiment, the position factor takes into account the position and orientation of each driving assistance sensor 12, 18, 44. Each driving assistance sensor 12, 18, 44 is associated with an individual position factor depending on the position and orientation. In the table below, a position factor is associated for various positions of the driving assistance sensor 12, 18, 44 as an example.

| Driving assistance sensor | Position factor |
| --- | --- |
| In an area behind the windshield | 1 |
| In a bumper area | 0.8 |
| In an exterior mirror area | 0.5 |
| In a rear region of a fin | 0.2 |
| . . . | . . . |

Alternatively, a separate direction factor could be considered. A direction factor would be useful, for example, if the orientation of the driving assistance sensors 12, 18, 44 is configured to be adjustable. By associating the position factor, a cleaning program is individually selected and set for each driving assistance sensor 12, 18, 44 from the predefined cleaning programs.

In a further method step 40, an overall factor is formed from the measured parameters and the further parameters/operating parameters that can be used to select the cleaning program. The overall factor is determined from an addition of the wetting factor and the speed factor and the position factor and other possible factors. The following formula is used to calculate the overall factor.

$$\text{Overall factor} = \text{wetting factor} + \text{speed factor} + \text{position factor} + \ldots$$

Alternatively, the overall factor could also be determined from multiplication of the parameters. Alternatively, individual or all measured parameters and/or parameters for determining the overall factor could be weighted and/or selected depending on an operating state of the vehicle 10 and/or the environmental sensor unit 14.

In a method step 32, a cleaning program is selected from a plurality of predefined cleaning programs for cleaning the sensor field surface 16 of the driving assistance sensor 12. For this purpose, a cleaning program is assigned to each value of the overall factor. In the table below, by way of example, each cleaning program is associated with a range of the overall factor.

| Cleaning program | Overall factor |
|---|---|
| 1 | ≥1 |
| 2 | ≥1.5 |
| 3 | ≥0.5 |
| . . . | . . . |

In a further method step 34, a cleaning program is selected from a plurality of predefined cleaning programs for cleaning the sensor field surface 20 of the further driving assistance sensor 18. The cleaning program is selected as a function of the measured parameters of the environmental sensor unit 14 used in method step 32. In order to select the cleaning program for cleaning the driving assistance sensor 12, the further driving assistance sensor 18 and all the additional further driving assistance sensors 44, the same measured parameter of the environmental sensor unit 14 and the same speed of the vehicle 10 is used.

In a further method step 38, the cleaning program for cleaning the driving assistance sensor 12, 18, 44 is set as a function of the degree of wetting and the speed of the vehicle 10 and the position of the respective driving assistance sensor 12, 18, 44.

In a further method step 72', the cleaning program selected and set in the preceding further method step 32, 34, 36, 38 is started. Alternatively, the cleaning program from the cleaning program selected and set in the preceding method run could be started in method step 72.

The invention claimed is:

1. A method for cleaning at least one driving assistance sensor (12), in an autonomously or semi-autonomously operated vehicle (10) having at least one environmental sensor unit (14), wherein, the method comprising, selecting a cleaning program from a plurality of cleaning programs for cleaning a sensor field surface of the driving assistance sensor (12), as a function of a measured parameter of the environmental sensor unit (14) and the vehicle (10) performing the selected cleaning program.

2. The method of claim 1, wherein further comprising, selecting a cleaning program from the plurality of cleaning programs for cleaning a sensor field surface of a further driving assistance sensor (18) of the autonomously or semi-autonomously operated vehicle (10) as a function of at least one measured parameter of the environmental sensor unit (14).

3. The method according to claim 1, wherein the driving assistance sensor (12) and the further driving assistance sensor (18) have differently oriented fields of view (74, 74').

4. The method according to claim 1, wherein the environmental sensor unit (14) is formed by a sensor unit (22) for controlling and/or activating a window wiper (24) of the vehicle (10).

5. The method according to claim 1, wherein the measured parameter is designed as a degree of wetting.

6. The method according to claim 1, wherein the measured parameter is configured as a light intensity.

7. The method according to claim 1, wherein the measured parameter is configured as a climate parameter.

8. The method according to claim 1, wherein in at least one further method step (36), the cleaning program is selected and/or set for cleaning the driving assistance sensor (12)/driving assistance sensors (12, 18) additionally as a function of an orientation of a field of view (74, 74') of the respective driving assistance sensor (12, 18) relative to a forward direction of the vehicle (10) and/or as a function of a position of the respective driving assistance sensor (12), 18) in the vehicle (10).

9. The method according to claim 1, wherein in at least one further method step (38), the cleaning program is selected and/or set for cleaning the driving assistance sensor (12)/driving assistance sensors (12, 18) additionally at least as a function of a speed of the vehicle (10) and/or a further operating parameter of the vehicle (10) that can be read from a control unit (26) of the vehicle (10), such as traffic volume in an environment of the vehicle (10) or a cleaning agent level of a cleaning system (28) of the vehicle (10).

10. The method according to claim 5, wherein in at least one method step (40), an overall factor is formed from at least two measured parameters and/or further parameters that can be used to select the cleaning program.

11. The method according to claim 1, wherein in at least one method step (42), a cleaning requirement for the driving assistance sensor (12) is determined based on an expiration of a time interval and/or based on a detected level of soiling of the driving assistance sensor (12), and that the cleaning program selected and/or set in the method step (32, 34, 36, 38, 40) is started if the cleaning requirement is positively determined.

12. A cleaning device for cleaning at least one driving assistance sensor (12) by means of a method according to claim 1, in an autonomously or semi-autonomously operated vehicle (10) having at least one environmental sensor unit (14) spaced apart from the driving assistance sensor (12), wherein a control and/or regulating unit (30) which is configured at least for selecting and/or setting a cleaning program from a plurality of cleaning programs for cleaning the driving assistance sensor (12) as a function of a measured parameter of the environmental sensor unit (14).

13. A semi-autonomous or fully-autonomous vehicle (10) having at least one driving assistance sensor (12), and having at least one environmental sensor unit (14), wherein the vehicle (10) is configured to perform the method according to claim 1.

14. The method of claim 10, wherein the overall factor is formed from a degree of wetting and a measured light intensity.

* * * * *